United States Patent [19]

Baugh et al.

[11] Patent Number: 4,661,016
[45] Date of Patent: Apr. 28, 1987

[54] SUBSEA FLOWLINE CONNECTOR

[75] Inventors: Benton F. Baugh, Houston; Narayana N. Panicker, Dallas, both of Tex.

[73] Assignee: Mobil Oil Corporation, New York, N.Y.

[21] Appl. No.: 722,087

[22] Filed: Apr. 11, 1985

[51] Int. Cl.[4] .......................... F16L 1/04; E21B 41/04
[52] U.S. Cl. .................................. 405/169; 166/343; 166/345; 405/170
[58] Field of Search ................. 405/168–171, 405/195; 285/18, 27; 166/343, 345

[56] References Cited

U.S. PATENT DOCUMENTS

| 3,356,136 | 12/1967 | Haeber | 166/343 X |
| 3,361,199 | 1/1968 | Haeber et al. | 166/345 |
| 3,500,906 | 3/1970 | Petersen | 166/345 X |
| 4,080,025 | 3/1978 | Garnier et al. | 166/343 X |
| 4,120,171 | 10/1978 | Chateau et al. | 405/169 |
| 4,182,584 | 1/1980 | Panicker et al. | |
| 4,367,055 | 1/1983 | Gentry et al. | |
| 4,386,659 | 6/1983 | Shotbolt | 405/169 X |
| 4,398,846 | 8/1983 | Agdern | |
| 4,423,984 | 1/1984 | Panicker et al. | |

OTHER PUBLICATIONS

OTC 4512 "Deepwater Production Riser", Panicker and Yancey, Presented at the 15th Annual Offshore Technology Conference, Houston, TX May 2–5, 1983.

Primary Examiner—Dennis L. Taylor
Attorney, Agent, or Firm—Alexander J. McKillop; Michael G. Gilman; Charles J. Speciale

[57] ABSTRACT

A subsea flowline connector for remotely connecting and releasing a first flowline such as a peripheral flowline on a marine riser to a complementary second flowline at a submerged location without the use of divers. Further, the seals in the connector may be remotely replaced without the need to bring the connector to the surface. Further, in one embodiment of present invention, a bundle of control/supply lines can be remotely connected to respective submerged lines at the same time as the flowline is connected.

28 Claims, 11 Drawing Figures

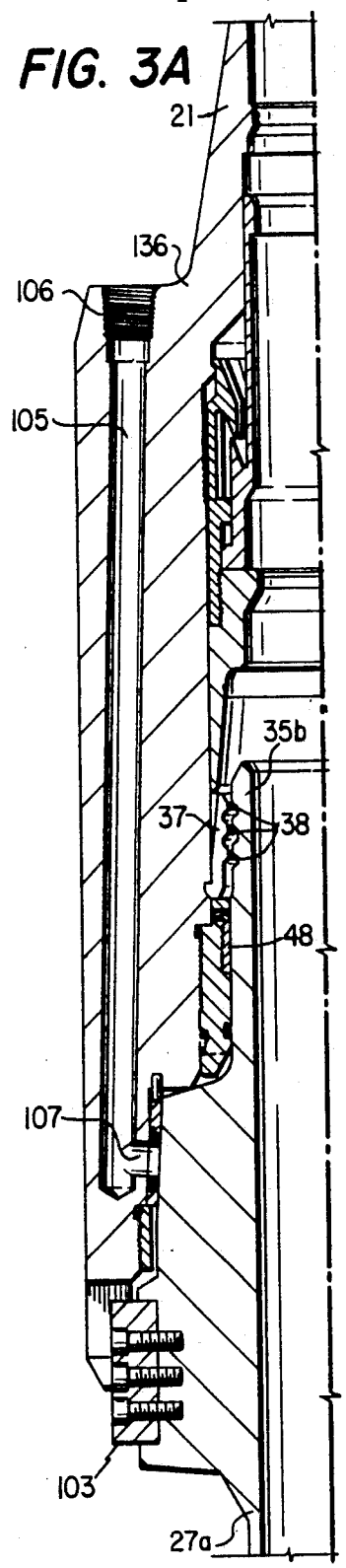
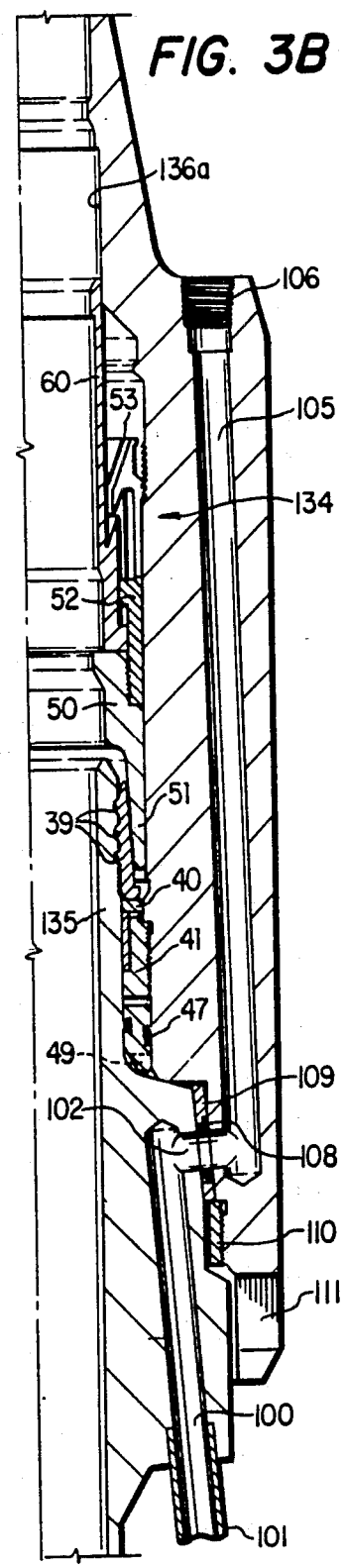

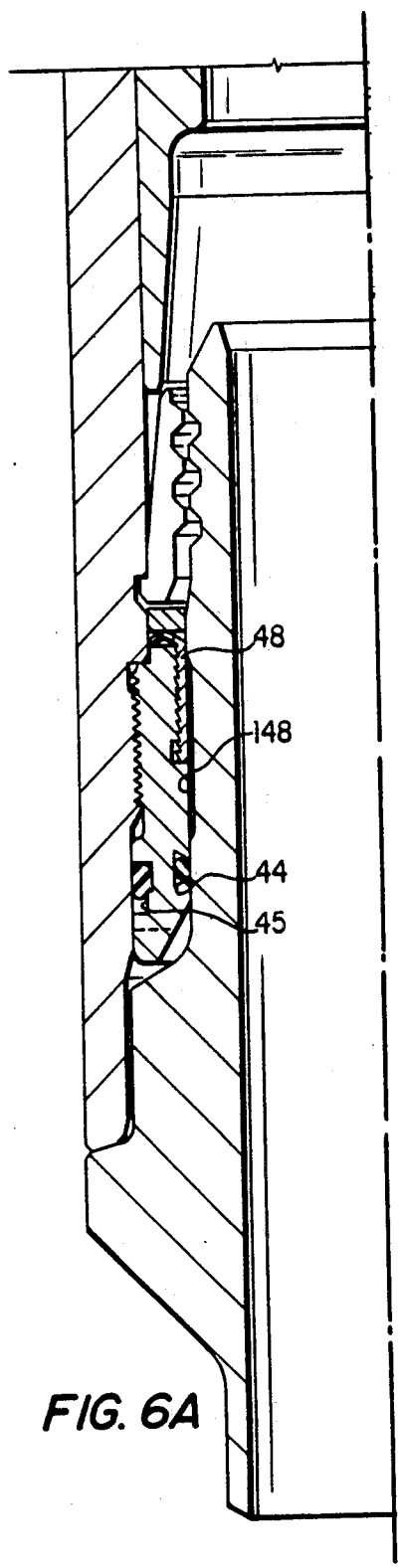
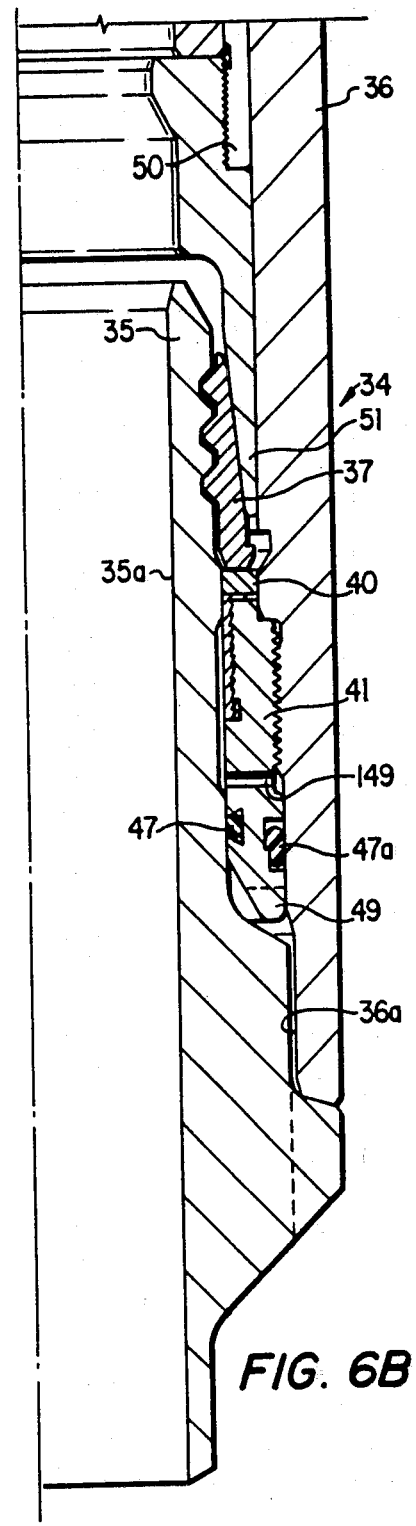
FIG. 6A
FIG. 6B

SUBSEA FLOWLINE CONNECTOR

DESCRIPTION

1. Technical Field

The present invention relates to a subsea flowline connector and more particularly relates to a connector for remotely connecting a first peripheral flowline and/or a bundle of hydraulic flowlines which extend along a marine riser to respective second flowlines on a riser base on the marine bottom.

2. Background Art

A critical consideration in the production of fluid hydrocarbons from marine deposits lies in providing a fluid communication system from the marine bottom to the surface after production has been established. Such a system, commonly called a production riser, usually includes multiple conduits through which various produced fluids are transported to and from the surface, including oil and gas production lines, service, electrical and hydraulic control lines.

For offshore production, a floating facility can be used as a production and/or storage platform. Since the facility is constantly exposed to surface and sub-surface conditions, it undergoes a variety of movements. In such a zone of turbulence, heave, roll, pitch, drift, etc., may be caused by surface and near surface conditions. In order for a production riser system to function adequately with such a facility, it must be sufficiently compliant to compensate for such movements over long periods of operation without failure.

Examples of such compliant marine riser systems are disclosed and discussed in U.S. Pat. Nos. 4,182,584; 4,367,055; 4,400,109; and 4,423,984; in paper OTC 4512, "Deepwater Production Riser", Panicker and Yancey, presented at the 15th annual Offshore Technology Conference, Houston, Tex., May 2–5, 1983; and in co-pending U.S. patent application Ser. No. 722,026 filed concurrently herewith. As seen from these references, a typical compliant riser system includes (1) a vertically rigid section which extends from the marine bottom to a fixed position below the zone of turbulence that exists near the surface of the water, and (2) a flexible section which is comprised of flexible flowlines that extend from the top of the rigid section, through the turbulent zone, to a floating vessel on the surface. A submerged buoy is attached to the top of the rigid section to maintain the rigid section in a substantially vertical position within the water.

Due to the substantial water depths in those production areas where compliant riser systems are designed for use, the use of divers on or near the marine bottom is virtually prohibited. Accordingly, all flowline and control line connections must be capable of being made remotely. Likewise, since a flowline or control line have certain seals associated therein that may become worn or damaged and have to be replaced during the operational life of the riser system, the connectors used for the flowlines and control lines must be capable of being remotely released so the necessary replacement operation can be carried out.

DISCLOSURE OF THE INVENTION

The present invention provides a subsea flowline connector for remotely connecting and releasing a first flowline such as a peripheral flowline on a marine riser to a complementary second flowline at a submerged location without the use of divers.

Further, the seals in the connector may be remotely replaced without the need to bring the connector to the surface. Further, in one embodiment of present invention, a bundle of control/supply lines can be remotely connected to respective submerged lines at the same time as the flowline is connected.

More specifically, the subsea connector of the present invention is comprised of a box member and a pin member. The box member is adapted to be connected to the lower end of a first flowline and the pin member is adapted to be connected to one end of the second flowline and be positioned at a submerged location on a riser landing base or the like on the marine bottom.

The box member has a split lockdown ring in the bore thereof which is inherently biased to an expanded position and which has a plurality of dogs thereon which are adapted to cooperate with grooves on the pin member when the lockdown ring is moved to a locked position. An actuator sleeve is slidably mounted in the bore of the box member and has a wedge portion on its lower end which cooperates with the lockdown ring to move said lockdown ring to a locked position. The actuator sleeve has ratchet shoulders thereon which cooperate with ratchet grooves in the bore of the box member to lock the actuator sleeve in its downmost position. The actuator sleeve is moved downward in the bore of the box member by fluid pressure exerted downward through the first flowline which forces a piston-like, setting tool which is in engagement with the actuator sleeve to move downward within the bore. The setting tool is removable from the bore of the box member by a wire-line tool which is lowered and raised through the flowline.

A shifting sleeve is slidably mounted in the bore of the box member and is adapted receive a positioning tool on a tool string through said flowline which when moved upward will cause the shifting sleeve to engage the actuator sleeve to release the ratchet shoulders from the ratchet grooves so that the actuator sleeve can move upward to unlock the lockdown ring.

Threaded into the lower end of the bore of the box member below the lockdown ring is a manipulator nut which carries both resilient seals and a soft metal, chevron-shaped seal. Downward movement of the actuator sleeve will also force the lockdown ring downward to thereby compress the soft metal of the chevron-shaped seal to provide the primary seal between the box member and the pin member. The resilient seals are also compressed radially to provide secondary seals between the box and pin members. The nut has slots in the lower surface which are adapted to be engage by a retrieval tool which, in turn, is operable from a remotely operated vehicle (ROV) once the subsea connector has been released and the box member has been raised from said pin member. Once the retrieval tool engages the nut, the first flowline is rotated to unscrew the nut. A new nut with new seals thereon can then be reassembled into the box member by reversing the above procedure. This allows worn or damaged seals to be remotely replaced without ever bringing the connector to the surface.

In one embodiment of the present connector, the box member and the pin member of the connector has a plurality of radially spaced passages therein which extend substantially parallel to the respective bores of the box and pin members. As the box member lands onto the pin member, respective passages in the box and pin members will align to establish fluid communicate between said respective passages. A pod-type seal is positioned around the outlet of each passage in the box member which, in turn, slides over and aligns with the inlet of a respective passage in the pin member to provide a seal therebetween.

BRIEF DESCRIPTION OF THE DRAWINGS

The actual construction, operation, and apparent advantages of the present invention will be better understood by referring to the drawings in which like numerals identify like parts and in which:

FIG. 3A is a sectional view of one embodiment of the subsea connector of the present invention with the connector in an open or unlocked position;

FIG. 3B is a sectional view of the connector of FIG. 3A with the connector in a closed or locked position;

FIG. 6A is a sectional view of the lower portion of the connector in an open or unlocked position;

FIG. 6B is a sectional view of the connector of FIG. 6A in a closed or locked condition.

BEST MODE FOR CARRYING OUT THE INVENTION

Figure 1:
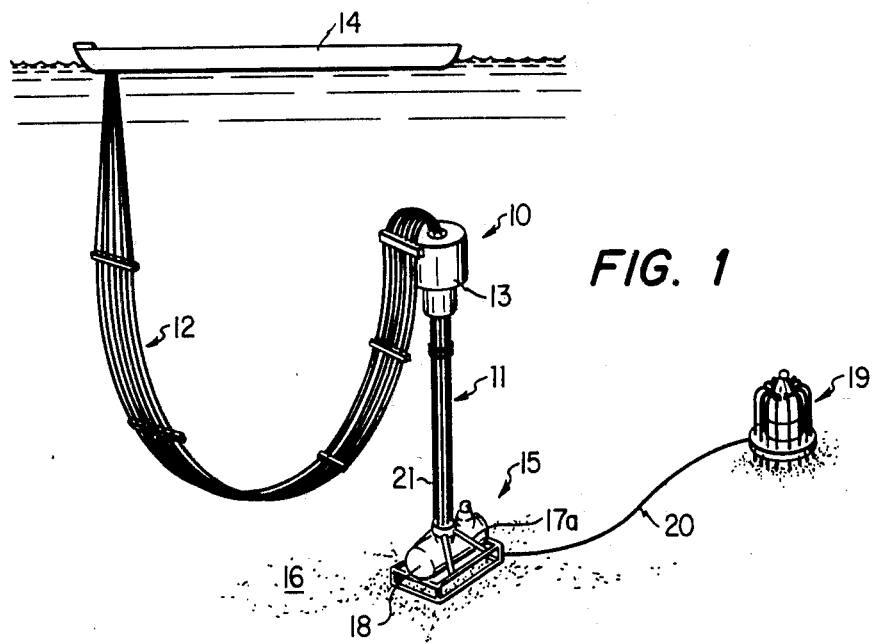
FIG. 1 is a perspective view of a typical environment, e.g. a marine compliant riser system, in which the present invention may be used.

To better understand the present invention, a brief description of a typical environment in which the flowline connector of the present invention is likely to find widespread use will first be set forth. Referring more particularly to the drawings, FIG. 1 discloses a typical compliant marine riser system 10 in an operable position at an offshore location. Riser system 10 is comprised of a lower rigid section 11 and an upper flexible section 12. Flexible section 12 is comprised of one or more flexible conduits which connect to respective first or peripheral flowlines 21 on rigid section 11 and which extend from buoy 13 to the surface of the water where they are connected to floating facility 14.

Rigid section 11 is affixed to a base 15 which in turn is present on marine bottom 16. As illustrated, base 15 includes a platform structure 17a, (sometimes called a "strongback") which is positioned over and spans subsea production equipment 18, e.g. a subsea atmospheric riser manifold (SARM) such as disclosed in U.S. Pat. No. 4,398,846. The production from one or more subsea wells 19 is connected to SARM 18 by submerged flowline 20 for production through riser.

Figure 2:
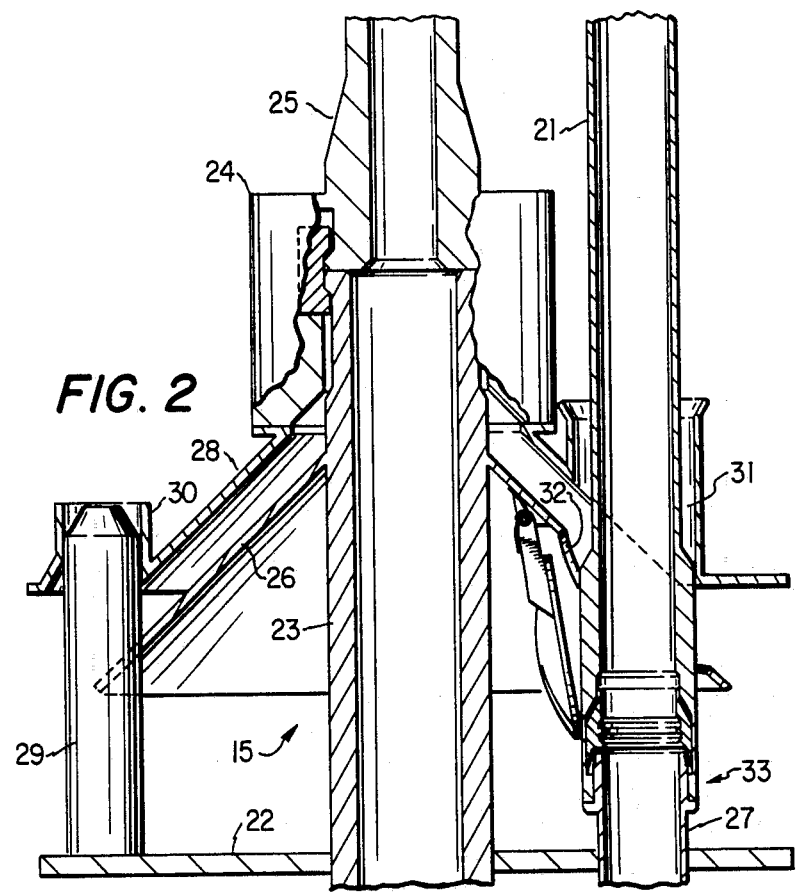
FIG. 2 is a sectional view of the land base and riser connection of the marine riser of FIG. 1.
Figure 4A:
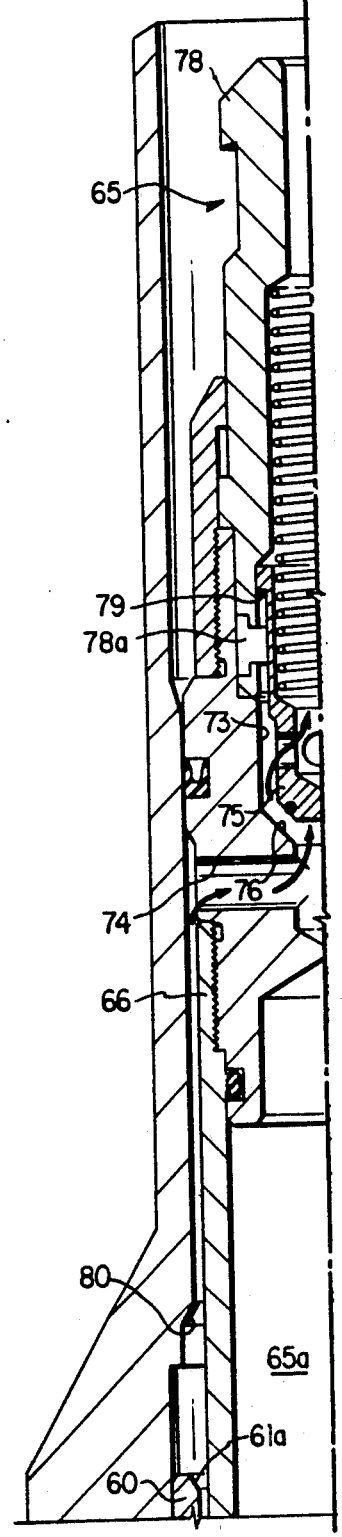
FIG. 4A is a sectional view of another embodiment of the subsea connector of the present invention showing the upper portion of the connector and the setting tool within the connector in an open or unlocked position.
Figure 4B:
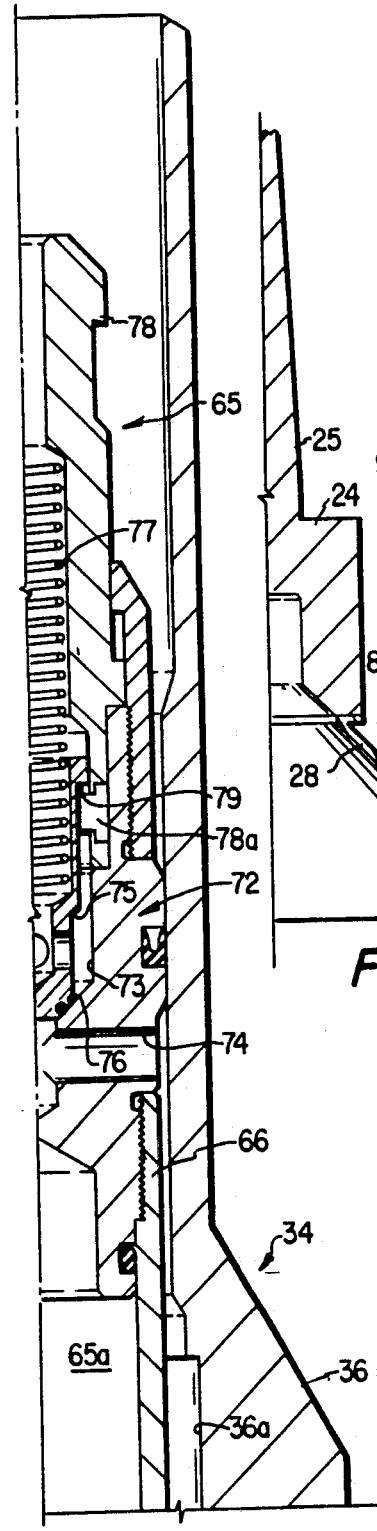
FIG. 4B is a sectional view of the connector and setting tool of FIG. 4A in a closed or locked position.

As illustrated in FIG. 2, base 15 is comprised of a template 22 having a mandrel 23 extending upward therefrom which is adapted to receive a hydraulic connector 24 on riser core 25 to secure the riser to the base. An inverted, cone-shaped cover plate 26 is attached to mandrel 23 and extends out over a plurality of connector heads 27 (only one shown) on template 22. Each connector head 27 is adapted to be completed to a second subsea production line leading to a subsea production source or to a subsea control or supply system as the case may be. An orienting, inverted funnel 28 depends from connector 24 to mate with coverplate 26 when the riser is assembled on base 15 and posts 29 on template 22 cooperate with guides 30 on funnel 28 to aid in final orientation. Flowline guides 31 and openings 32 in funnel 28 and cover plate 26, respectively, are vertically aligned to permit peripheral flowline 21 to be passed downward therethrough and to be connected to head 27 on template 22 by flowline connector 33 of the present invention. The details of base 15 and the riser connector means shown in FIG. 2 are disclosed in commonly assigned, co-pending U.S. patent application Ser. No. 722,026, filed concurrently herewith.

Referring now to FIGS. 3-6, flowline connector 33 of the present invention is comprised of a box member 34 and a pin member 35 having a bore 35a therethrough. Pin member 35 forms part of connector head 29. Box member 34 is comprised of a hollow housing 36 which is adapted to be affixed to the lower end of a first flowline 21. Positioned within the bore 36a of housing 36 is lockdown ring 37 which is made of spring steel or the like. Ring 37 is inherently biased toward an expanded or open position as shown in FIGS. 3A, 5A but is split in one place so that it can be compressed to a locked or closed position (FIGS. 3B, 5B) as will be further explained below. Lockdown ring 37 has a plurality of dogs 38 thereon which cooperate with a plurality of annular grooves 39 in pin member 35 when ring 37 is moved to a locked position.

Lockdown ring 37 is positioned on a seal load ring 40 (FIGS. 3, 6) which, in turn, is held in place by manipulator nut 41. Nut 41 is threaded at 42 to mate with threads 43 within bore 36a of housing 36 and has an inner dovetail groove 44 and an outer double step groove 45 having a reduced lower portion, for receiving annular, resilient seal means 47, 47a, respectively, therein. Also carried by nut 41 is a soft metal (e.g. stainless steel AISI 304 or 316) seal 48 (FIG. 6A) having at least one chevron-shaped portion extending over the top of nut 41 and below seal load ring 40 for a purpose to be explained in more detail below. Metal seal 48 is threaded onto nut 41 with threads (e.g. left-hand threads) that are opposite from the threads (e.g. right-hand threads) which couple nut 41 to housing 36. This is to prevent metal seal 48 from unthreading whenever nut 41 is unthreaded from housing 36. Slots 49 (FIG. 6) are provided in the lower surface of nut 41 which are adpated to receive a seal replacement tool as will also be explained below.

Slidably positioned in bore 36a of housing 36 above lockdown ring 37 is actuator sleeve 50 which, in turn, has a wedge section 51 adapted to cooperate with the outer surface of ring 37 to move ring 37 inwardly as sleeve 50 is moved downward. Sleeve 50 is threaded at its upper end to collet body 52; the upper portion of said collet body being sawcut into individual collets 53 which, in turn, are inherently biased outward but have sufficient flexibility to permit inward movement toward the longitudinal axis of bore 36a. Each collet 53 has a detent shoulder 54 at the upper, outer periphery thereof which cooperates with an annular detent groove 55 in housing 36 to hold actuator sleeve 50 in its open or upward position until connector 33 is to be set and locked. Each collet 53 also has a ratchet shoulder 56 on its outer periphery and spaced below detent shoulder 55, said ratchet shoulder 56 being adapted to cooperate with one of a plurality of annular ratchet grooves 57 which are provided in bore 36a of housing 36 for a purpose described below. Each collet 53 also has an inner, downward and inwardly sloping release surface 58 for a purpose explained below.

Slidably mounted within collet body 52 and normally resting on actuator sleeve 50 is a shifting sleeve 60 which, in turn, has a shifting shoulder 61 adapted to be engaged by a releasing tool (not shown). Sleeve 60 has an upward and outwardly sloping surface 62 thereon which is adapted to cooperate with surface 58 on collet body 52 to release ratchet shoulder 56 from grooves 57 when sleeve 60 is moved upward with respect to collet body 52 as will be further described below.

Figure 5A:
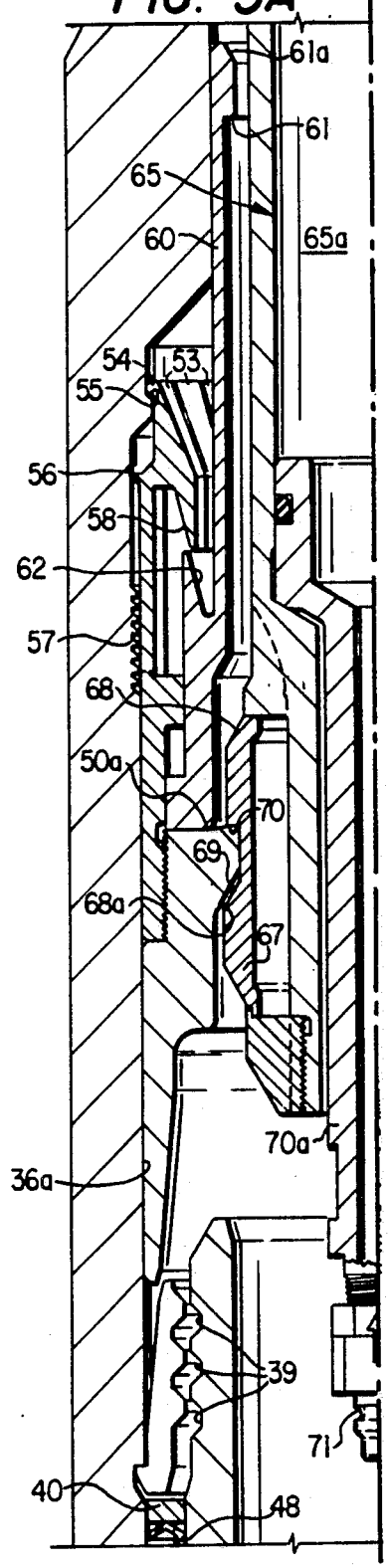
FIG. 5A is a sectional view of the midportion of the connector and setting tool in an open or unlocked position.
Figure 5B:
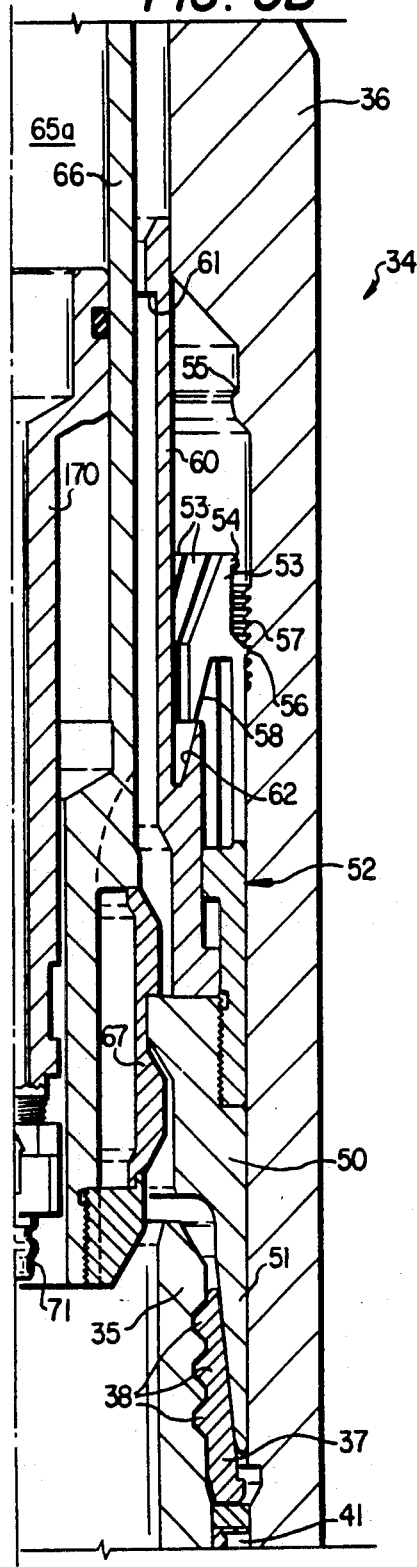
FIG. 5B is a sectional view of the connector and setting tool of FIG. 5A in a closed or locked position.

FIGS. 3A, 4A, 5A, and 6A, all show connector 33 in an open position. To set connector 33, a bore pressure setting tool 65 (FIGS. 4 and 5) is used as will be described below. Setting tool 65 is comprised of body 66 having a landing ring 67 mounted on the lower end thereof (FIGS. 5A, 5B). Ring 67 is constructed of spring steel or the like and is inherently biased to an expanded position (FIG. 5A) but is split in one place so that it can move inwardly when compressed. The outer surface of ring 67 has two cam surfaces 68, 69 thereon and a flat shoulder 70, the latter of which is adapted to engage the upper surface 50a of actuator sleeve 50 when tool 65 is in an operable position.

Slidably mounted in and extending out the lower end of body 66 is a hollow, fluid displacing piston 170. The lower end of piston 170 is closed by a quick disconnect, check valve fitting 71. Sub 72 is connected to the upper end of body 66 and has a center passage 73 and lateral passage 74 to provide for fluid flow through sub 72. Check valve 75 is normally biased to a closed position on seat 76 by spring 77. Fishing neck 78 is slidably mounted in body 66. Neck 78 carries four keys 78a (only two shown) radially spaced at 90° intervals, which are adapted to engage shoulder 79 on check valve 75 to open valve 75 when neck 76 is moved upward.

In operation, housing 36 of box member 34 is welded or otherwise secured to the lower end of first or peripheral flowline 21. Next, chamber 65a in setting tool 65 is charged via fitting 71 with gas pressure (e.g. nitrogen) equal to approximately 200 psi above the ambient pressure at the depth at which connector 33 is to be set. This is to provide a "gas bubble" behind piston 170 which allows limited upward movement of piston 170 during setting operations so that tool body 66 can be pumped downward against a fluid filled blind hole as required when setting connector 33. This will be described in more detail below. Tool 65 is then inserted, fishing neck first, through the lower end of housing 36. Cam surface 68 will cooperate with surface 68a (FIG. 5A) on actuator sleeve 50 to move landing ring 67 inward to allow ring 67 to move through actuator sleeve until shoulder 70 clears sleeve 50. Ring 67 then expands so that flat shoulder 70 rests on upper surface 50a of sleeve 50. Setting tool 65 is now in an operable position.

By adding appropriate joints of pipe to peripheral flowline 21, box member 34 is run downward until it is landed on pin member 35. As flowline 21 is run, it is filled with seawater through check valve 75 which is moved upward off seat 75 by the water pressure. When box member 34 is landed on pin member 35, fluid pressure is applied down through flowline 21. This downward pressure causes check valve 75 to close and tool 65 to move downward within box member 34. Shoulder 70 on landing ring 67 pushes against surface 50a of actuator sleeve 50 to cam detent shoulders 54 on collets 53 out of engagement with detent groove 55. This allows wedge 51 to move downward to force lockdown ring 37 inward so that dogs 38 engage grooves 39 on pin member 35. As collets 53 move downward, ratchet shoulders 56 engage ratchet grooves 57 to lock actuator sleeve 50 in its downmost position. This prevents lockdown ring 37 from disengaging from its locked position. Again, it is noted that the body 66 of tool 65 can move downward against a fluid-filled, pin member 35 since piston 170 can move upward. This prevents any "hydraulic locking" of tool 66 during the setting operation.

As actuator sleeve 50 moves downward and wedge 51 moves behind lockring 37, lockring 37 will also bear down on seal load ring 40 to axially load chevron metal seal 48 thereby causing radial expansion thereof and brinelling of its relatively soft metal against the harder metal of box member 34 and pin member 35. By causing plastic flow in the metal of seal 48, the full range of elastic energy is stored in seal 48 to maintain seal 48 in effect.

Resilient seals 47, 47a are provided in connector 33 as a secondary backup to the primary metal sheet 48. After setting seal 48, testing will confirm that at least one of the seals is holding pressure, but may not actually distinguish which one is sealing. The inner seal 47 is a conventional seal in dovetail groove 44 for the remote stabbing operation. The outer seal 47a is in double step groove 45. When run, seal 47a will be in the deeper groove section closer to the metal seal. The setting operation of metal seal 48 will force any liquid (e.g. seawater) present around the seal downward through groove 148 in pin member 35, through opening 149 and downward toward the resilient seal 47a. Double step groove 45 allows seal 47a to be moved downwardly to accomodate this flow and still seal. This prevents possible "hydraulic locking" of the connector which might otherwise be caused by this liquid.

Once connector 33 is set and locked, a standard wireline fishing tool (not shown) is run down through peripheral flowline 21 and is landed and locked onto fishing neck 78 of tool 66. Merely by pulling upward on tool 66, cam surface 69 on landing ring 67 reacts with surface 68a on sleeve 50 to move ring 67 inward to thereby release tool 66 which is then removed through flowline 21.

If it becomes necessary to unlock connector 33, a positioning tool (not shown) such as a Type B Otis Positioning Tool, distributed by Otis Engineering Corporation of Dallas, Tex., is run inverted on a tool string (e.g. tubing) down through peripheral flowline 21 and into box member 34. The positioning tool has a split ring or equivalent spring-loaded dog mechanism which is normally biased outward and which has a cam surface thereon that cooperates with surface 61a on shifting sleeve 60 (FIG. 5A) to allow the split ring to move through the upper part of sleeve 60 until a forse shoulder on the tool is aligned with shoulder 61 on sleeve 60. The ring is then free to move outward under bias whereby the force shoulder engages shoulder 61 on sleeve 60. The positioning tool is then pulled upward to move shifting sleeve 60 upward whereby surface 62 on sleeve 60 cooperates with surface 58 on collets 53 to move collets 53 inward to release ratchet shoulder 56 from grooves 57.

Actuator sleeve 50 is now free to be moved upward by continued upward movement of the positioning tool. As wedge 51 moves upward from behind lockdown ring 37, the inherent resiliency of ring 37 moves it to an open position thereby disengaging dogs 38 from grooves 39 in pin member 35. Connector 33 is now in an unlocked position and box member 35 can be removed from pin member 34. As the positioning tool is raised further, a second cam surface on the split ring of the tool will engage surface 80 (FIG. 4A) within bore 36a of box member 34 to force the split ring on the positioning tool inwardly to thereby release the positioning tool from shifting sleeve 60.

Figure 7:
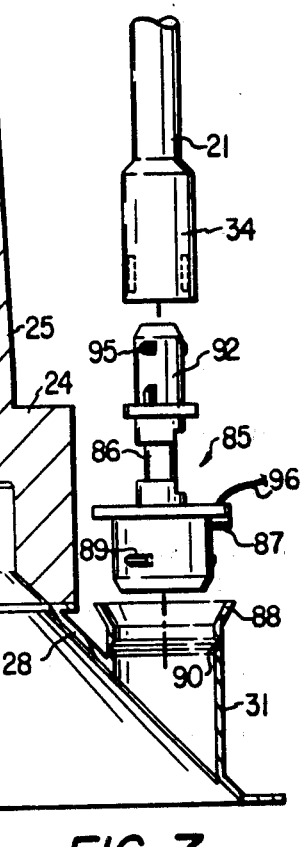
FIG. 7 is a perspective view of the seal retrieval tool in position adjacent the connector of the present invention.

In the connector of the present invention, it is possible to change the seals, if and when the need arises, without bringing the connector to the surface. This saves substantial time and effort since the peripheral flowline 21 does not have to be disassembled and then reassembled. Referring now to FIG. 7, box member 34 is unlocked as described above and peripheral flowline 21 is raised above flowline guide 31 on funnel 28. A seal replacement tool 85 is positioned into flowline guide 31 by a manipulator arm (not shown) of a remotely operated vehicle (ROV) which grasps the reduced portion 86 of tool 85. Key 87 on tool 85 fits into slot 88 on guide 31 to prevent rotational movement therebetween and hydraulic dogs 89 (only one shown) cooperate with groove 90 in guide 31 to prevent vertical movement.

Next, flowline 21 is lowered to position nut 41 of box member 34 onto the upper section 92 of tool 85. Keys 93 on tool 85 fit into slots 49 (FIG. 6) in nut 41 so that when flowline 21 is rotated, nut 41 is unscrewed from box member 34. Dog 95 on tool 85 is hydraulically actuated to hold nut 41 on tool 85 during removal. The above procedure is reversed to install a new nut 41 with a new chevron seal 48 and resilient seals 47, 47a thereon and connector 33 is reset to complete the operation. Dogs 89 and 95 are actuated through hydraulic lines 96 from the ROV.

In operating a subsea production system such as one serviced by a compliant marine riser 10 of FIG. 1, there is almost always a need to connect a set of control lines to base 15. This set or bundle of control lines includes lines for hydraulic power supply and for specific control functions for remotely operated subsea equipment. The embodiment of the present invention shown in FIGS. 3A and 3B provides a means for remotely connecting a bundle of hydraulic and/or control lines at a subsea location. Referring now to FIGS. 3A, 3B, the pin member 135 of one or more connector heads 27a on template 22 has a plurality (e.g. 14 but only one shown) of axial passages 100 radially spaced therein to which control and/or supply output lines 101 are attached. Each axial passage 100 has a substantially horizontal, interconnecting passage 102 at its upper end which opens to the outer periphery of pin member 135. Orientation key 103 is attached to pin member 135 at a location which would otherwise be occupied by an axial passage 100.

Box member 135 of connector 33 is identical to that described above except housing 136 has a plurality (e.g. 15) of axially extending passages 105 which are adapted to be connected at their upper ends 106 to respective control and/or supply input lines not shown). Each passage 105 terminates at its lower end in a substantially horizontal passage 107 which opens into bore 136a of box member 34a. A pod type seal 108 mounted in retainer 109 is positioned about the opening of each passage 107 and is held in place by a threaded member 110. A pod-type seal is a seal designed to be typically used in subsea BOP control ports and designed to surround a radial port in two concentric, conical surfaces and be energized by interference compression as to the two conical surfaces are brough close to each other, see pg. 5507, 1984-85 Composite Catalog of Oil Field Equipment and Services, Gulf Publishing Co. A plurality (e.g. 15) of orienting slots 111 are spaced around the lower surface of box member 34a.

In operation, box member 34a is attached to the lower end of a peripheral flowline 21 and is lowered as before. Box member 34a can be landed by a straight stab with the nearest of slots 111 on the lower end of box member 34a being cammed onto key 103 on pin member 35a to orient passages 107 in box member 134 with respective passages 102 in pin member 135. The passage 105 in box member 34a overlying key 103 will be dead-ended and is not usuable. It is noted that since the lines connected to passages 105 will not be landed in a set orientation, the operator will have to rely on some other means for identifying the positioning of the control and/or supply line (e.g. remote TV observation). It can be seen that the box member 134 can be locked and released from pin member 135 by connector 33 as fully described above and that hydraulic control and/or supply lines (i.e. passages 105, 107, 102, 100) can easily be connected and separated if and when the need arises to remove flowline 21.

What is claimed:

1. A subsea flowline connector for remotely connecting a first flowline to a complementary second flowline at a submerged location, said connector comprising:
    a box member adapted to be affixed to the lower end of said first flowline, said box member comprising:
    a housing having a bore therethrough;
    a manipulator nut threaded into the lower end of said bore;
    a metal seal carried by the upper surface of said manipulator nut;
    a seal load ring slidably mounted in said bore above said soft metal seal;
    a lockdown ring in said bore positioned above said seal load ring; said lockdown ring being inherently biased to an expanded position;
    an actuator sleeve slidably mounted in said bore above said lockdown ring;
    means on said actuator sleeve adapted to cooperate with said lockdown ring for moving said lockdown ring to a locked position upon downward movement of said actuator ring;
    and means for releasably securing said actuator sleeve in its uppermost position within said bore;
    means on said actuator sleeve adapted to be engaged by a setting tool for releasing and moving said actuator sleeve downward upon application of fluid pressure in said bore to move said lockdown ring to a locked position and to compress said metal seal;
    means for locking said actuator sleeve in its downmost position within said bore when said actuator sleeve is moved downward within said sleeve; and
    a pin member adapted to be affixed to one end of said second flowline, said pin member adapted to receive said box member; and means on said pin member adapted to cooperate with said lockdown ring when said lockdown ring is in a locked position for securing said box member to said pin member.

2. The subsea connector of claim 1 wherein said means for releasably securing said actuator sleeve comprises:
a collet body attached to the upper end of said actuator sleeve, said collet body having a plurality of collets which are inherently biased outwardly toward said housing; and
a detent shoulder on the upper, outer periphery of each of said collets adapted to be received by a detent groove in said housing.

3. The subsea connector of claim 2 wherein said means for locking said actuator sleeve comprises:
a ratchet shoulder on the outer periphery of each collet spaced below said detent shoulder; and
a plurality of ratchet grooves in said bore of said housing adapted to receive said ratchet shoulders.

4. The subsea connector of claim 3 wherein said lockdown ring comprises:
a ring of spring steel inherently biased to an expanded position and axially split in one place to allow said ring to be compressed to a locked position; and
a plurality of vertically, spaced dogs on the inner surface of said ring;
and wherein said pin member includes a plurality of vertically spaced, annular grooves in the outer periphery thereof adapted to receive said dogs when said locking is moved to its locked position.

5. The subsea connector of claim 4 wherein said means for moving said lockdown ring to a locked position comprises:
a wedge member secured to the lower end of said actuator sleeve and adapted to move downward between said lockdown ring and said housing to move said lockdown ring inwardly from said housing.

6. The subsea connector of claim 5 wherein said manipulator nut comprises:
a nut threaded into the lower end of said bore of said housing and having an internal groove and an external groove thereon;
seal means mounted in both said internal and external grooves for sealing between said nut and said pin member and between said housing and said nut, respectively.

7. The subsea connector of claim 6 wherein said soft metal seal is affixed to said nut and having one or more chevron-shaped portions extending over the top of said nut.

8. The subsea connector of claim 7 wherein said nut includes radial grooves in the lower surface thereof adapted to receive a seal replacement tool to remotely unscrew said nut from said housing.

9. The subsea connector of claim 8 including:
means for releasing said ratchet shoulders on said collets to thereby permit said actuator sleeve to move upward to unlock said connector.

10. The subsea connector of claim 9 wherein said means for releasing said ratchet shoulders comprises:
a downward and inward sloping release surface on each of said collets; and
a shifting sleeve slidably mounted in said bore of said housing normally resting in a down position on said actuator sleeve, said shifting sleeve adapted to cooperate with said release shoulders on said collets when said shifting sleeve is moved upward to thereby move said collets inwardly to release said ratchet shoulders on said collets from said ratchet grooves in said housing; and
means on said shifting sleeve adapted to receive a positioning tool whereby said shifting sleeve can be moved upward in said housing.

11. The subsea connector of claim 10 including:
a setting tool releasably mounted in said bore of said housing; said setting tool comprising:
a body;
a compressible landing ring mounted on said body which is inherently to an expanded position, said landing ring having a shoulder thereon adapted to engage said means on said actuator sleeve for releasing and moving said actuator sleeve downward;
a piston slidably mounted in and extending downward from said body and defining a chamber in said body above said piston; and
means for filling said chamber with a compressible fluid.

12. The subsea connection of claim 11 wherein said setting tool further includes:
a fishing neck mounted to the upper end of said body adapted to receive a wireline tool;
said landing ring has an inclined surface thereon adapted to cooperate with a surface within said bore of said housing when said setting tool is move upward to thereby compress said landing ring to release same from said actuator sleeve.

13. The subsea connector of claim 12 wherein said setting tool includes:
a passage through said fishing neck;
a check valve positioned within said passage to allow upward flow through said passage but to prevent downward flow therethrough; and
means on said finishing neck for opening said check valve upon upward movement of said fishing neck.

14. The subsea connector of claim 13 wherein said housing of said box member has a plurality of passages extending therethrough, each of said passages having an inlet and an outlet;
said pin member having a plurality of passages therein, each of said passages having an inlet and outlet and positioned so that an outlet of one of said passages in said box member will fluidly communicate with an inlet of a respective one of said passages in said pin member when said box member is received by said pin member.

15. The subsea connector of claim 14 including:
seal means on said outlet of each passage through said box member adapted to cooperate with said pin member for establishing a fluid-tight seal between said respective passages in said box member and said pin member.

16. The subsea connector of claim 15 wherein said seal means on said passage outlet comprises:
a pod-type seal surrounding said outlet; and
means for securing said pod-type seal in place.

17. The subsea connector of claim 16 wherein said passages in said box member radially spaced from each other and extend axially and substantially vertically therethrough and substantially parallel to said bore of said housing, each of said passages terminating at its lower end in a substantial horizontal passage which opens into said bore of said housing to provide said outlet of said passage in said box member; and and wherein said passages in said pin member are radially spaced from each other and extend axially and substantially vertically therethrough, each passage terminating at its upper end in a substantially horizontal passage which opens to the exterior of said pin member to provide said inlet for said passage in said pin member.

18. The subsea connector of claim 17 including:
an orientation key on said pin member; and
a plurality of slots radially spaced in the lower surface of said housing of said box member, any one of said slots being adapted to receive said key to properly orient said outlets of said passages in said box member with respective said inlets of said passages in said pin member.

19. A subsea flowline and control/supply line connector comprising:
a box member and a pin member;
said box member comprising a housing having a bore therethrough and being adapted to be affixed to the lower end of a flowline;
said housing also having a plurality of radially spaced passages therein which extend axially and substantially parallel to said bore of said housing, each of said passages having an inlet adapted to be coupled to a control/supply line and an outlet;
said pin member having a bore therethrough adapted to be connected to a submerged flowline, said pin member having a plurality of radially spaced passages therein which extend axially and substantially parallel to said bore of said pin member, each of said passages having an outlet adapted to be connected to a submerged control/supply line and an inlet adapted to align with a said outlet of one of said passages in said box member when said box member is received by said pin member; and
means in said bore of said housing of said box member adapted to cooperate with said pin member for locking said box member to said pin member.

20. The subsea connector of claim 19 including:
seal means on said outlet of each passage through said box member adapted to cooperate with said pin member for establishing a fluid-tight seal between said respective passages in said box member and said pin member.

21. The subsea connector of claim 20 wherein said seal means on said passage outlet comprises:
a pod-type seal surrounding said outlet; and means for securing said pod-type seal in place on said box member.

22. The subsea connector of claim 21 wherein each of said passages in said box member terminate at its lower end in a passage which opens into said bore of said housing to provide said outlet of said passage in said box member;
and wherein each of said passages in said pin member terminate at its upper end in a passage which opens to the exterior of said pin member to provide said inlet for said passage in said pin member.

23. The subsea connector of claim 22 including:
an orientation key on said pin member; and
a plurality of slots radially spaced in the lower surface of said housing of said box member, any one of said slots being adapted to receive said key to properly orient said outlets of said passages in said box member with respective said inlets of said passages in said pin member.

24. A subsea flowline connector for remotely connecting a first flowline to a complementary second flowline at a submerged location, said connector comprising:
a box member adapted to be affixed to the lower end of said first flowline and a pin member adapted to be affixed to one end of said second flowline and adapted to receive said box member, said box member comprising:
a housing having a bore therethrough;
a manipulator nut threaded into the lower end of said bore of said housing; said nut having a plurality of radial grooves in the lower surface that are exposed at the lower end of said box member when said box member is out of engagement with said pin member, said grooves adapted to receive a tool means for remotely unscrewing said nut from said housing; and
seal means for sealing between said housing and said pin member when said box member is received by said pin member.

25. The subsea connector of claim 24 wherein said seal means comprises:
a metal seal having a portion thereof extending over the upper surface of said nut.

26. The subsea connector of claim 24 wherein said manipulator nut includes an internal groove and an external groove therein; and wherein said seal means includes:
a resilient seal mounted in said internal groove for sealing between said nut and said pin member when said box member is received on said pin member; and
a resilient seal mounted in said external groove for sealing between said nut and said housing.

27. The subsea connector of claim 26 wherein said external groove is of double step configuration having a reduced lower portion.

28. The subsea connector of claim 26 wherein said seal means further includes:
a method seal having a portion thereof extending over the upper surface of said nut.

* * * * *